(12) United States Patent
Liu et al.

(10) Patent No.: US 9,729,277 B2
(45) Date of Patent: Aug. 8, 2017

(54) SIGNAL DETECTING METHOD AND DEVICE

(71) Applicant: Tsinghua University, Beijing (CN)

(72) Inventors: Leibo Liu, Beijing (CN); Guiqiang Peng, Beijing (CN); Peng Zhang, Beijing (CN); Yang Xue, Beijing (CN); Shouyi Yin, Beijing (CN); Shaojun Wei, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 15/331,875

(22) Filed: Oct. 23, 2016

(65) Prior Publication Data

US 2017/0170928 A1 Jun. 15, 2017

(30) Foreign Application Priority Data

Dec. 14, 2015 (CN) .......................... 2015 1 0925676
Dec. 23, 2015 (CN) .......................... 2015 1 0980633

(51) Int. Cl.
| | |
|---|---|
| *H03D 1/00* | (2006.01) |
| *H04L 27/06* | (2006.01) |
| *H04L 1/02* | (2006.01) |
| *H04L 5/00* | (2006.01) |
| *H04B 17/336* | (2015.01) |
| *H04B 7/04* | (2017.01) |
| *H04B 7/0413* | (2017.01) |
| *H04W 88/08* | (2009.01) |

(52) U.S. Cl.
CPC ................. *H04L 1/02* (2013.01); *H04B 7/04* (2013.01); *H04B 17/336* (2015.01); *H04L 5/006* (2013.01); *H04B 7/0413* (2013.01); *H04W 88/08* (2013.01)

(58) Field of Classification Search
CPC ......... H04L 1/02; H04L 5/006; H04B 17/336; H04B 7/04; H04B 7/0413; H04W 88/08
USPC ........................ 375/341, 343, 346, 229, 262
See application file for complete search history.

(56) References Cited

U.S. PATENT DOCUMENTS

2014/0301504 A1* 10/2014 Chavali ................ H04B 7/0413
375/316

* cited by examiner

*Primary Examiner* — Phuong Phu
(74) *Attorney, Agent, or Firm* — Hodgson Russ LLP

(57) ABSTRACT

A signal detecting method and device are disclosed. The method includes: obtaining a matched filtering signal; determining a filtering matrix; decomposing the filtering matrix to obtain a principal diagonal matrix and a non-principal diagonal matrix; obtaining a parameter matrix and a parameter vector according to the principal diagonal matrix, the non-principal diagonal matrix, and the matched filtering signal; obtaining an iterative parameter and an iterative initial value according to the parameter matrix and the parameter vector; and performing an iterative calculation according to the iterative parameter and the iterative initial value; if the number of iterations reaches a preset number, obtaining an iterative final value, and obtaining an input of a decoder according to the iterative final value. The signal detection method may reduce the computational complexity and bit error rate, improve data throughput, and more advantageous for use in a large-scale multi-input multi-output system.

20 Claims, 13 Drawing Sheets

SIGNAL DETECTING METHOD AND DEVICE

FIELD

The present disclosure relates to the communication technology field, and more particularly to a signal detecting method and device.

BACKGROUND

With the development of the communication technology, frequency spectrum resources become increasingly scarce. In order to solve this problem, simultaneous transmission of multiple signal flows in a same frequency band may be realized through a large-scale multi-input multi-output (MIMO) system. The system is divided into an uplink and a downlink. In the uplink, encoded signals from antennas of a plurality of users are sent to a plurality of antennas of a base station. Since there are interference and channel noise between various antennas, the base station needs to decode the received encoded signals, so as to realize signal detection.

Currently, the common signal detection method includes linear algorithms like a zero-forcing (ZF) detecting method and a minimum mean square error (MMSE) etc., and non-linear algorithms such as a sphere decoding (SD) and a K-Best algorithm etc. Non-linear algorithms for detecting the accuracy are widely applied in the large-scale multi-input multi-output system. However, for the large-scale multi-input multi-output system, if an antenna size grows in hundreds, realizing non-linearity on limited hardware resources of the base station will lead to a high computation complexity and a low degree of parallelism.

SUMMARY

According to embodiments of the present disclosure, a signal detecting method is disclosed, applied to a base station which is configured to receive an encoded signal, and including:

obtaining a matched filtering signal;

determining a filtering matrix used when obtaining the matched filtering signal;

decomposing the filtering matrix to obtain a principal diagonal matrix and a non-principal diagonal matrix;

obtaining a parameter matrix and a parameter vector for an iterative calculation according to the principal diagonal matrix, the non-principal diagonal matrix, and the matched filtering signal;

obtaining an iterative parameter and an iterative initial value according to the parameter matrix and the parameter vector;

performing the iterative calculation according to the iterative parameter and the iterative initial value; and if the number of iterations reaches a preset number, obtaining an iterative final value, and obtaining an input of a decoder according to the iterative final value, so as to decode the encoded signal and to realize the signal detecting.

According to embodiments of the present disclosure, a signal detecting device is disclosed, applied to a base station which is configured to receive an encoded signal, and including:

a matrix and matched filtering calculating circuit, configured to calculate a matched filtering signal, a channel Gram matrix and a filtering matrix;

a pre-processing circuit, configured to calculate a parameter matrix and a parameter vector for an iterative calculation and principal diagonal elements of an effective channel gain matrix according to the filtering matrix, the matched filtering signal and the channel Gram matrix;

an iterative circuit, configured to obtain an iterative parameter and an iterative initial value according to the parameter matrix and the parameter vector, and to perform the iterative calculation according to the iterative parameter and the iterative initial value, and to obtain an iterative final value if the number of iterations reaches a preset number; and a maximum log likelihood rate calculating circuit, configured to obtain a maximum log likelihood rate according to the iterative final value and the principal diagonal elements of the effective channel gain matrix, and to input the maximum log likelihood rate to a decoder so as to decode the encoded signal and to realize the signal detecting.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above-described and/or additional aspects and advantages of embodiments of the present disclosure will become apparent and more readily appreciated from the following descriptions made with reference to the drawings, in which.

DETAILED DESCRIPTION

Exemplary embodiments will be described in detail herein, and examples thereof are illustrated in accompanying drawings. Throughout figures referred by the following description, the same reference number in different figures indicates the same or similar elements unless otherwise stated. Implementations described in the following exemplary embodiments do not represent all the implementations consistent with the present disclosure. Instead, they are only examples of the device and method consistent with some aspects of the present disclosure detailed in the appended claims.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Figure 1:
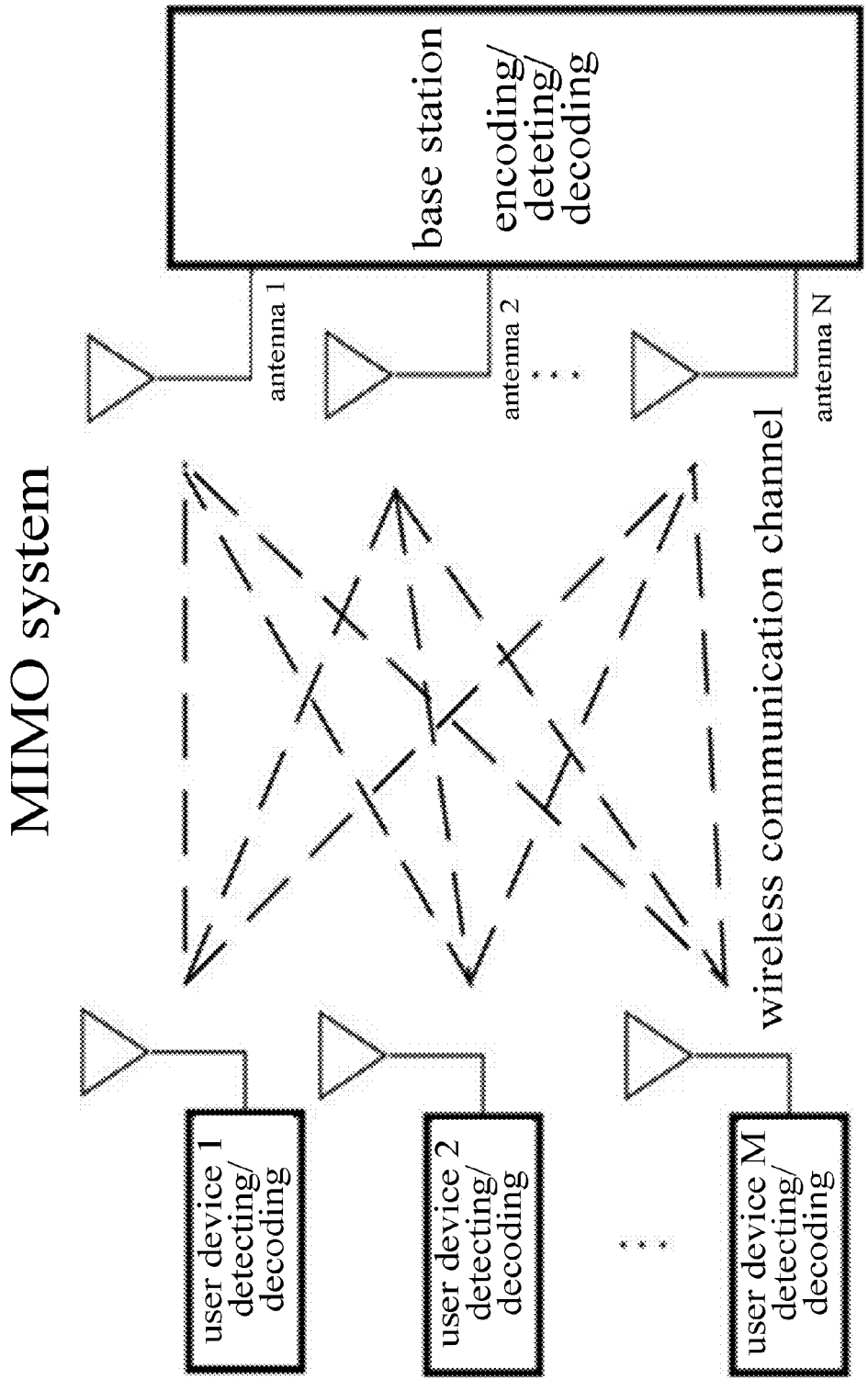
FIG. 1 is a schematic diagram of a multi-input multi-output system for wireless communication according to an embodiment of the present disclosure.

First, a multi-input multi-output system for wireless communication is briefly introduced. FIG. 1 shows a schematic diagram of a multi-input multi-output system for wireless communication. As shown in FIG. 1, the multi-input multi-output system includes a base station and a plurality of user devices. Each user device has an antenna. The base station has an antenna array. There is a wireless communication channel between a plurality of antennas of the plurality of the user devices and the antenna array. The plurality of user devices may respectively transmit signal with the base station via the wireless communication channel. For example, in FIG. 1, assuming that the number of the user devices is M, and the number of the antennas of the base stations is N, then the formed wireless communication channel is N rows by M columns. In order to simulate an actual environment, if elements in the channel matrix of the wireless communication channel meet a flat Rayleigh fading distribution, a channel matrix H is formed.

Figure 2:
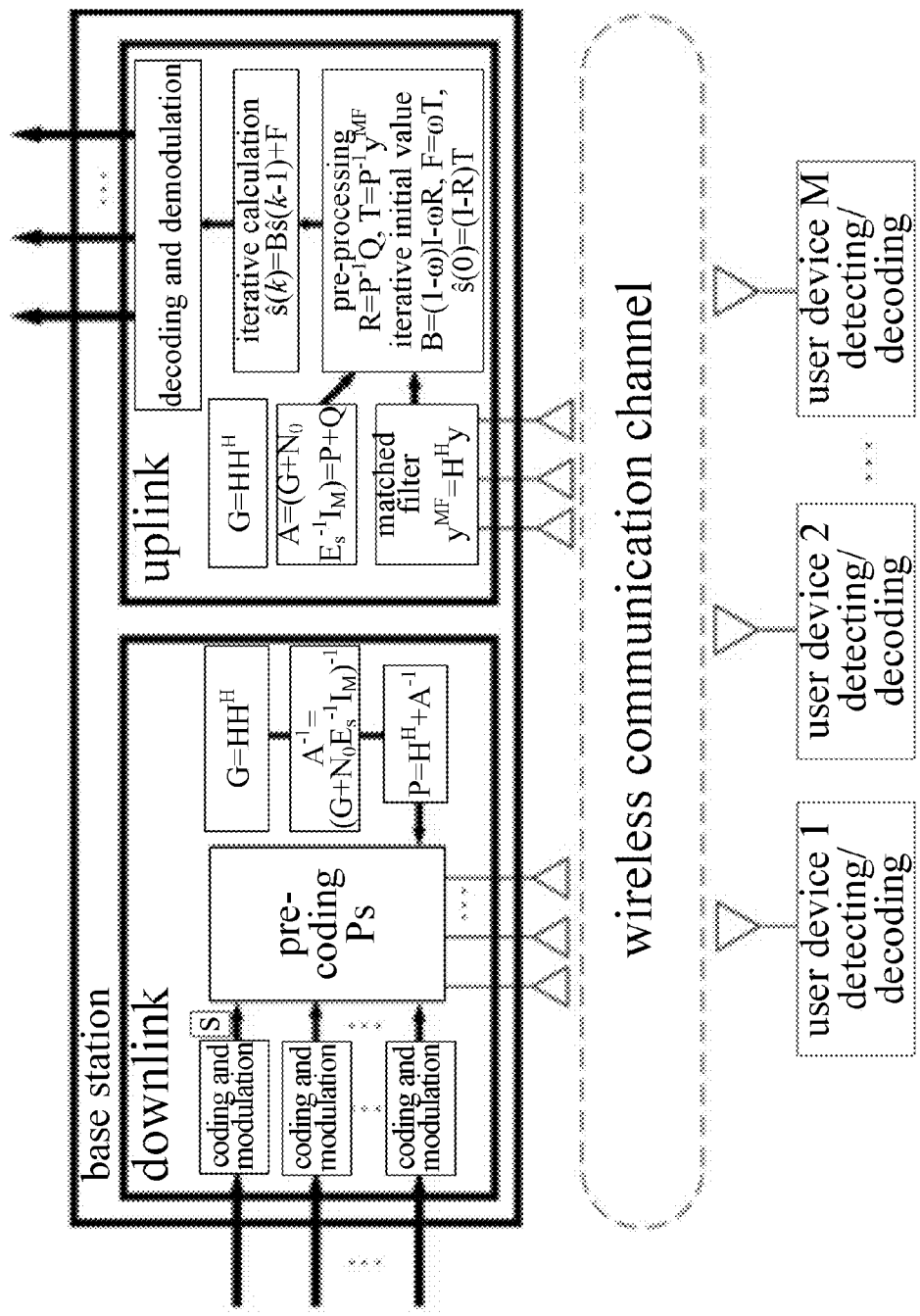
FIG. 2 is another schematic diagram of a multi-input multi-output system for wireless communication according to an embodiment of the present disclosure.

FIG. 2 shows another schematic diagram of a multi-input multi-output system for wireless communication. The multi-input multi-output system is suitable for a bidirectional communication, which are respectively an uplink and a downlink. The downlink sends data to the user device from the base station, while the uplink sends data to the base station from the user device. Since the user device is usually a mobile terminal which has a relatively poor computation capacity such as a cellphone, a signal process for the uplink/downlink is usually integrated in the base station.

Figure 5:
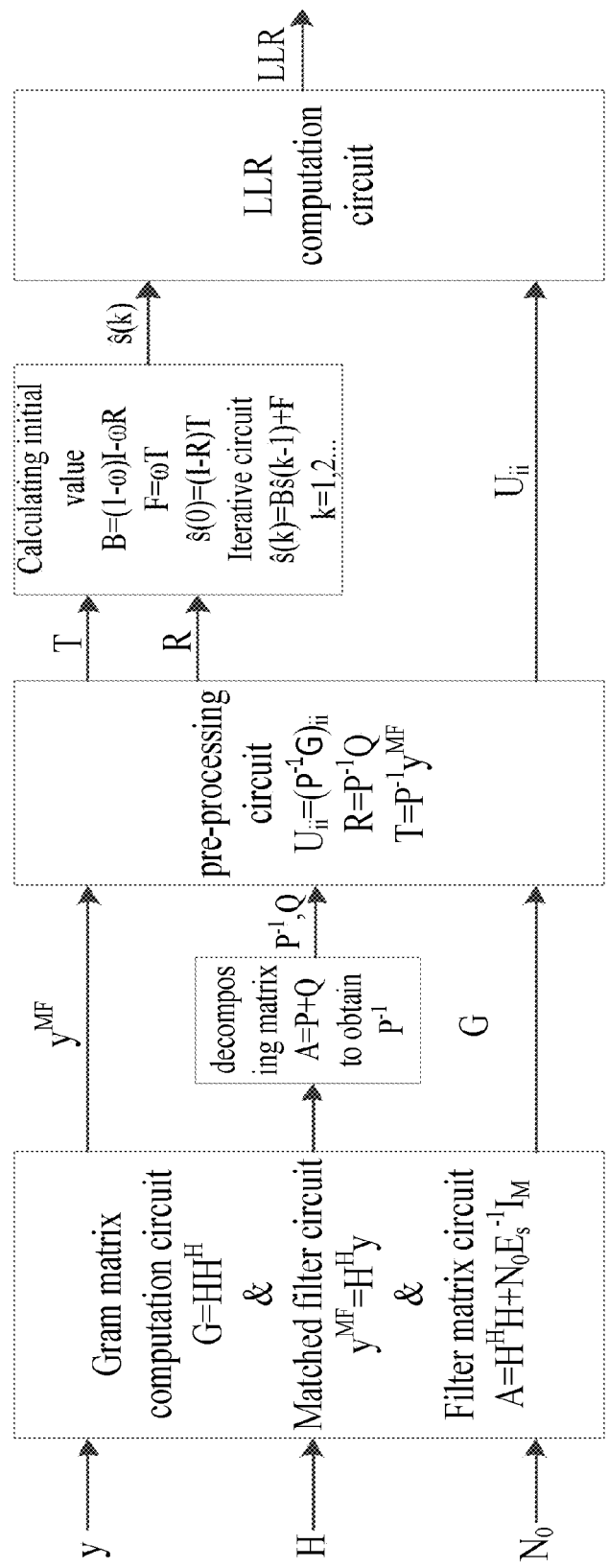
FIG. 5 is a schematic diagram of a signal detection device according to an embodiment of the present disclosure.

Specifically, in a signal process of the downlink, a plurality of coding and modulation modules are used to receive the signal. After coding and modulation, the signal is formed to a traffic flow. in order to make the signal maintain an original value after a channel transmission, a pre-coding process is required for the signal. Especially in the multi-input multi-output system, a pre-coding circuit reversely uploads the channel information on the transmission signal for maintaining the original value after passing through the channel. The pre-coding process includes a Gram matrix calculating circuit, a matrix inversion circuit, and a pre-coding circuit, as shown in FIG. 5. First, a channel matrix H is received, the channel matrix H is transferred into a channel Gram matrix G by $G=HH^H$ and the channel Gram matrix G is used in a later matrix inversion. An inversion module is formed to calculate or estimate an inversion unit of a matrix so as to calculate the inversion of matrix A, i.e. $A^{-1}=(G+N_0E_s^{-1}I_M)^{-1}$. For a "zero-forcing detection" algorithm, a mean square root of noise is regarded as 0, therefore $A^-=G^{-1}$. Matrix $A^{-1}$ is used to calculate the pre-coding matrix P by $P=H^H A^{-1}$, as shown in FIG. 5. The pre-coding matrix P is output to the pre-coding circuit to perform a pre-coding process Ps. The processed signal is then transmitted to the user device by the transmission antenna via the downlink. The downlink process further includes some serial-parallel conversion and inverse Fourier transform module, which shall not be elaborated herein.

In the uplink, the signal after the wireless communication channel may be represented by y=Hs, in which, s indicates an original signal sent by the user device, y indicates the signal after the channel received by the array antenna in the base station.

For various matrix operations, such as data receiving and storing, matrix multiplication, matrix addition and subtraction, in the above-described uplink and downlink, may be realized by using software, hardware or cooperative running of software and hardware, for example, writing application directly working on a general-purpose processor, or making an application-specific integrated circuit ASIC, or using a field programmable logic array to realize. A different realization method will finally reach a different running speed. In general, ASIC is with the fastest speed and the lowest power consumption.

The uplink, i.e. the user device sending data to the base station, is mainly described in the present disclosure. In order to better explain how to conduct the signal detection control, the uplink shall be further described herein.

For the uplink, the number of signals which may be transmitted together at a same time by all the user devices may be determined by the number of antennas M. Therefore all the transmission bits are a subset of the following binary vectors:

$$X^u=[x_1^u; \ldots ; x_L^u],$$

where $L=Mlog_2(B)$, a superscript u indicates an uplink, B is constellation points of transmission, and the number of signals transferred for each user is $log_2(B)$ bits. Specifically, the uplink is realized in steps as follows.

1. Mapping (Grey mapping) a binary bit stream to a transmission vector as follows:

$$S^u \epsilon O^M,$$

where, $S^u$ indicates an original signal, O indicates a collection of constellation points, M indicates the number of antennas. Here, the superscript u indicates an uplink. Each user device may use the same constellation points or different constellation points. An average energy of each signal is $E_s$.

2. The vector $s^U$ is transmitted upward to the base station end via the wireless channel. The uplink may be modeled as:

$$y^u = H^u s^u + n^u,$$

where $y^u$ indicates the vector received by the base station, $n^u$ is an additive channel thermal noise, $H^u$ is an uplink channel matrix including transmission characteristics of the channel.

The received binary vector may be:

$$y^u = [y_1^u; \ldots; y_N^u],$$

the uplink channel matrix $H^u$ and the additive channel thermal noise $n^u$ if may be:

$$H^u \in C^{N \times M}, n^u \in C^N,$$

where the input of H meets a flat Rayleigh distribution, the input of n meets independent and identically distributed zero mean Gaussian distribution, and the variance of each complex-value input is $N_0$.

For the uplink, the function of the base station end is to calculate or estimate the original signal $s^u$ via the channel matrix $H^u$ and received signal $y^u$. Then an original vector X is formed via the decoding and the demodulation, in which the received signal y may be detected by the receiving antenna and the channel matrix H may be detected by a known pilot signal. A specific process may refer to the signal detecting method and device disclosed in embodiments of the present disclosure.

The signal detecting method and device according to embodiments of the present disclosure are specifically described referring to drawings.

Figure 3:
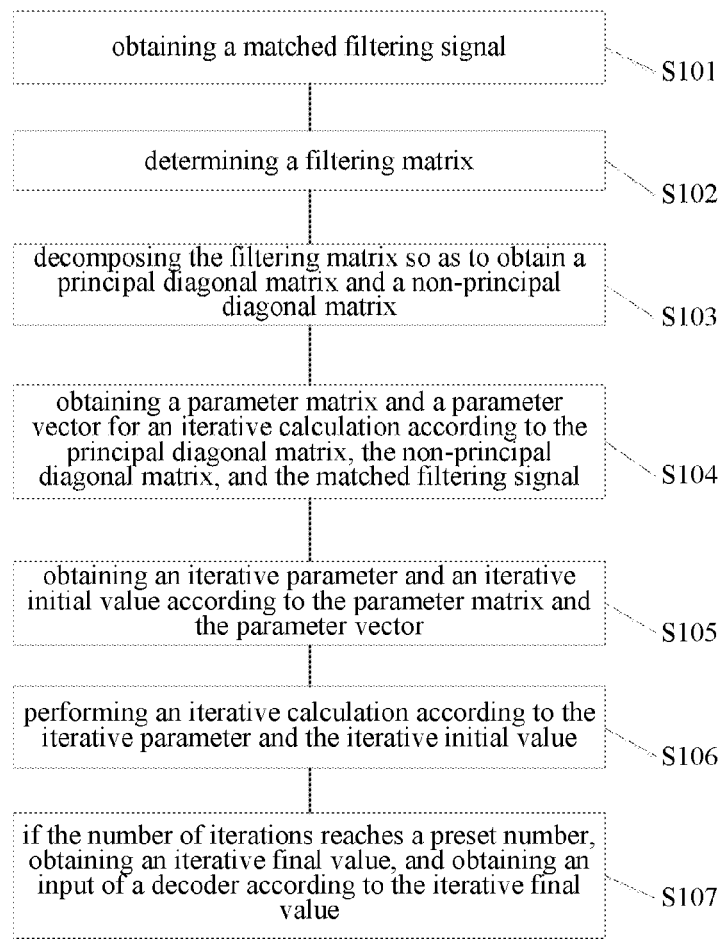
FIG. 3 is a flow chart of a signal detection method according to an embodiment of the present disclosure.

According to embodiments of the present disclosure, the signal detecting method is disclosed referring to drawings. As shown in FIG. 3, the signal detecting method may have steps as follows.

In S101, a matched filtering signal $y^{MF}$ is obtained.

In an embodiment of the present disclosure, obtaining a matched filtering signal $y^{MF}$ includes: obtaining the matched filtering signal $y^{MF}$ by a formula of $$y^{MF} H^H y,$$

where, y is the encoded signal which is a signal via the channel received by an antenna array of the base station, $H$ is a channel matrix, and is a conjugate transpose matrix of the channel matrix H.

In step S102, a filtering matrix A used when obtaining the matched filtering signal $y^{MF}$ is determined.

In an embodiment of the present disclosure, the filtering matrix A is obtained by a formula of $$A = H^H H + N_0 E_s^{-1} I_M,$$

where, $N_0$ is a noise power spectrum density, $E_s$ is an average power for each transmission signal, $E_s^{-1}$ is a reciprocal value of the average power for each transmission signal, $I_M$ is a unit matrix, and M is the number of antennas in the antenna array of the base station.

In step S103, the filtering matrix A is decomposed so as to obtain a principal diagonal matrix P and a non-principal diagonal matrix Q.

In step S104, a parameter matrix R and a parameter vector T for an iterative calculation are obtained according to the principal diagonal matrix P, the non-principal diagonal matrix Q, and the matched filtering signal $y^{MF}$.

In an embodiment of the present disclosure, obtaining a parameter matrix R and a parameter vector T for an iterative calculation according to the principal diagonal matrix P, the non-principal diagonal matrix Q, and the matched filtering signal $y^{MF}$ includes: obtaining the parameter matrix R according to the principal diagonal matrix P and the non-principal diagonal matrix Q by a formula of $$R = P^{-1} Q;$$

where, $P^{-1}$ is an inverse matrix of the principal diagonal matrix P;

obtaining the parameter vector T according to the principal diagonal matrix P and the matched filtering signal $y^{MF}$ by a formula of $$T = P^{-1} y^{MF}.$$

In an embodiment of the present disclosure, obtaining principal diagonal elements of an effective channel gain matrix U according to the principal diagonal matrix P and a channel Gram matrix G by a formula of $$U_{ii} = (P^{-1} G)_{ii},$$

where, $U_{ii}$ indicates the $i^{th}$ principal diagonal element of the effective channel gain matrix U. The channel Gram matrix G is obtained according to the channel matrix H by a formula of $$G = HH^H.$$

More specifically, as shown in FIG. 2, after the base station receives the data via antenna matched filter MF, the matched filter outputs the signal. Meanwhile the uplink module needs to calculate A in advance and extract its principal diagonal elements as the principal diagonal matrix P, and its non-principal diagonal elements as the non-principal diagonal matrix Q. The principal diagonal elements of the principal diagonal elements P are the principal diagonal elements of A, and the non-principal diagonal elements of the principal diagonal elements P are 0; the non-principal diagonal elements of the non-principal diagonal matrix Q are the non-principal diagonal elements of A, and the principal diagonal elements of the non-principal diagonal matrix Q are 0.

Further, in order to maximize the calculated degree of parallelism, and pipelining extension, some iteration parameter matrices need be calculated in advance, wherein calculating a parameter matrix R by a formula of $R = P^{-1}Q$, an effective channel gain matrix U by a formula of $U = P^{-1}G$ and a parameter vector T by a formula of $T = P^{-1}y^{MF}$. During the calculation, it is required to calculate the inverse of the principal diagonal matrix P. However, P here only has the nonzero principal diagonal elements, and it only needs to calculate the reciprocal value of the principal diagonal elements. In addition the effective channel gain U needs only output the principal diagonal elements $U_{ii}$.

This act can be completed by storage units via flexible subscript calculation without taking up computing resources.

In step 105, an iterative parameter and an iterative initial value $\hat{s}(0)$ are obtained according to the parameter matrix R and the parameter vector T.

In an disclosure of the present disclosure, the iterative parameters include an iterative coefficient matrix B and an iterative constant matrix F; obtaining an iterative parameter and an iterative initial value $\hat{s}(0)$ according to the parameter matrix R and the parameter vector T includes:

obtaining the iterative coefficient matrix B according to a time relaxation parameter ω and the parameter matrix R by a formula of $$B = (1-\omega)I - \omega R,$$

where, I is a unit matrix;

obtaining the iterative constant matrix F according to the time relaxation parameter ω and the parameter vector T by a formula of

F=ωT;

obtaining the iterative initial value ŝ(0) according to the parameter matrix R and the parameter vector T by a formula of

ŝ(0)=(I−R)T.

Further, it can be seen that it is not involved the matrix calculation multiplication when calculating B and F, and it only needs the relatively simple matrix addition and subtraction, and scalar multiplication. In addition, the time relaxation parameter ω plays an important role in setting the iteration convergence and convergence speed, and 0<ω<1 is required. Then the iterative initial value ŝ(0)=(I−R)T. When the number of iterations is limited, the iteration initial value determined will have a certain impact on the accuracy and computed amount of detection. In the conventional iterative methods, the iterative initial value is set to 0 vector. However, by the nature of the matrix A for further exploration, it can be found that the principal diagonal elements in the matrix A is dominant, which makes the principal diagonal of the matrix A is close to N and the non-principal diagonal of the matrix A is close to 0, when the number N of antennas of the base station is much larger than the number M of antennas of the users. While by using Newman series to estimate $A^{-1}=P^{-1}-P^{-1}QP^{-1}$. We can set the iteration initial vector $ŝ(0)=P^{-1}-P^{-1}QP^{-1})H^Hy$, and according to previous parameter calculation it can be reduced to ŝ(0)=(I−R)T. Such design results of the iteration initial vector can he closer to the final iteration vector desired, so that calculation is more accurate, iteration is faster, thereby reducing the amount of computation.

In step S106, the iterative calculation is performed according to the iterative parameter and the iterative initial value ŝ(0).

In an embodiment of the present disclosure, performing the iterative calculation according to the iterative parameter and the iterative initial value ŝ(0), includes: performing the iterative calculation by a formula of ŝ(k)=Bŝ(k−1)+F, where, k is the number of iterations, and k is a positive integer equal to or greater than 1. More specifically, as shown in FIG. 3, the initial value and the parameter is put into the iteration formula, and after finite iterations, the more accurate original results can be obtained.

In the calculation process, a new idea of directly solving equations rather than a multiplication after seeking the inverse of the coefficient matrix has improved hardware efficiency, and the computational parallelism is also increased by dividing steps.

In step 107, if the number of iterations reaches a preset number, an iterative final value is obtained, and an input of a decoder is obtained according to the iterative final value, so as to decode the encoded signal and to realize the signal detecting.

In an embodiment of the present disclosure, obtaining an input of a decoder according to the iterative final value includes:

obtaining a computation signal according to the iterative final value and principal diagonal elements of an effective channel gain matrix by a formula of $$\varphi_b(ŝ_i) = \min_{s \in S_b^0} \left| \frac{ŝ_i}{U_{ii}} - s \right|^2 - \min_{s \in S_b^1} \left| \frac{ŝ_i}{U_{ii}} - s \right|^2,$$

where, $ŝ_i$ is the $i^{th}$ iterative final value, b is a bit index of a log likelihood rate of the $i^{th}$ user $U_{ii}$ is the $i^{th}$ principal diagonal element of the effective channel gain matrix U, $\phi_b(ŝ_i)$ is a computation signal corresponding to the $i^{th}$ iterative final value, min is a minimum operator, s is a transmission signal, and $S_b^0$ and $S_b^1$ denotes sets of modulation constellation symbols, in which the $i^{th}$ bit is 0 and 1, respectively;

calculating a signal to interference plus noise ratio SINR according to principal diagonal elements of the effective channel gain matrix and an average power for each transmission signal by a formula of $$\rho_i^2 = \frac{U_{ii}}{E_s(1 - U_{ii})},$$

where, is the SINR, and $E_s$ is the average power for each transmission signal; and obtaining a maximum log likelihood rate by multiplying the computation signal with the SINR by a formula of $L_{i,b}=\rho_i^2\phi_b(ŝ_i)$, where $L_{i,b}$ is the maximum log likelihood rate, and the maximum log likelihood rate is regarded as the input of the decoder.

According to the signal detection method disclosed in embodiments of the present disclosure, first the matched filtering signal of the encoded signal is obtained; the filter matrix used in the process of obtaining the matched filtered signal is determined; the filter matrix is decomposed, so as to obtain the principal diagonal matrix and the non-principal diagonal matrix; the parameter matrix and the parameter vector for the iterative calculation are obtained according to the principal diagonal matrix, the non-principal diagonal matrix, and the matched filtering signal; the iterative parameter and the iterative initial value are obtained according to the parameter matrix and the parameter vector; and the iterative calculation is performed according to the iterative parameter and the iterative initial value; and the iterative final value is used to obtain the input of the decoder, so as to realize the signal detecting. The signal detection method disclosed in the present disclosure may reduce the computational complexity and bit error rate, improve data throughput, and more advantageous for use in the large-scale multi-input multi-output system.

Figure 4:
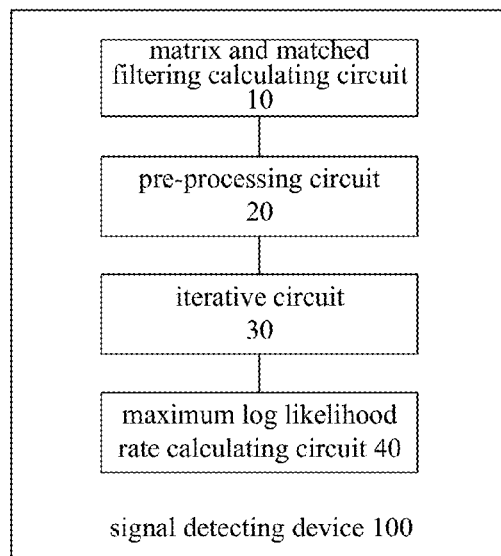
FIG. 4 is a block diagram of a signal detection device according to an embodiment of the present disclosure.

According to embodiments of the present disclosure, the signal detecting device is disclosed, as shown in FIG. 4. The signal detecting device includes: a matrix and matched filtering calculating circuit 10, a pre-processing circuit 20, an iterative circuit 30, and a maximum log likelihood rate (LLR) calculating circuit 40.

Referring to FIG. 5, the matrix and matched filtering calculating circuit 10 is configured to calculate a matched filtering signal $y^{MF}$, a channel Gram matrix G and a filtering matrix A; the pre-processing circuit 20 is configured to calculate a parameter matrix R and a parameter vector T for an iterative calculation and principal diagonal elements $U_{ii}$ of an effective channel gain matrix U according to the filtering matrix A, the matched filtering signal $y^{MF}$ and the channel Gram matrix G; the iterative circuit 30 is configured to obtain an iterative parameter and an iterative initial value ŝ(0) according to the parameter matrix R and the parameter vector T, and to perform the iterative calculation according to the iterative parameter and the iterative initial value ŝ(0), and if the number of iterations reaches a preset number, to obtain an iterative final value; and the maximum log likelihood rate calculating circuit 40 is configured to obtain a maximum log likelihood rate according to the iterative final value and the principal diagonal elements $U_{ii}$ of the effective channel gain matrix G, and to input the maximum log likelihood rate to a decoder so as to decode the encoded signal and to realize the signal detecting.

Further, as shown in FIG. 5, the matrix and matched filtering calculating circuit 10 realizes a function of calculating the Gram matrix G and the matched filtering signal $y^{MF}$. Input signals include the channel matrix H with the flat Rayleigh distribution, the signal vector y received by the base station, the noise power spectrum density $N_0$, and average power $E_s$ for each transmission signal; and output signals include matrices G, $P^{-1}$, and vector $y^{MF}$.

The pre-processing circuit 20 realizes a function of performing an iterative pre-processing, calculating the parameter matrix R and the parameter vector T. Input signals include matrices G, $P^{-1}$, and vector $y^{MF}$; and output signals include matrix R, vector T and effective channel gain $U_{ii}$.

The iterative circuit 30 realizes a function of calculating an iterative initial value and performing an iterative calculation. Input signals include matrix R, vector and parameter ω; and output signal includes detecting result vector ŝ.

The maximum log likelihood rate calculating circuit 40 realizes a function of calculating a LLRs value. Input signals include detecting result vector ŝ and effective channel gain $U_{ii}$; and output signals include the LLRs value.

There are 6 different basic calculating units to form the matrix and matched filtering calculating circuit 10, the pre-processing circuit 20, the iterative circuit 30, and the maximum likelihood rate calculating circuit 40. The basic calculating units may be a first processing unit PE-A, a second processing unit PE-B, a third processing unit PE-C, a fourth processing unit PE-D, a fifth processing unit PE-E and a sixth processing unit PE-F.

Figure 7:
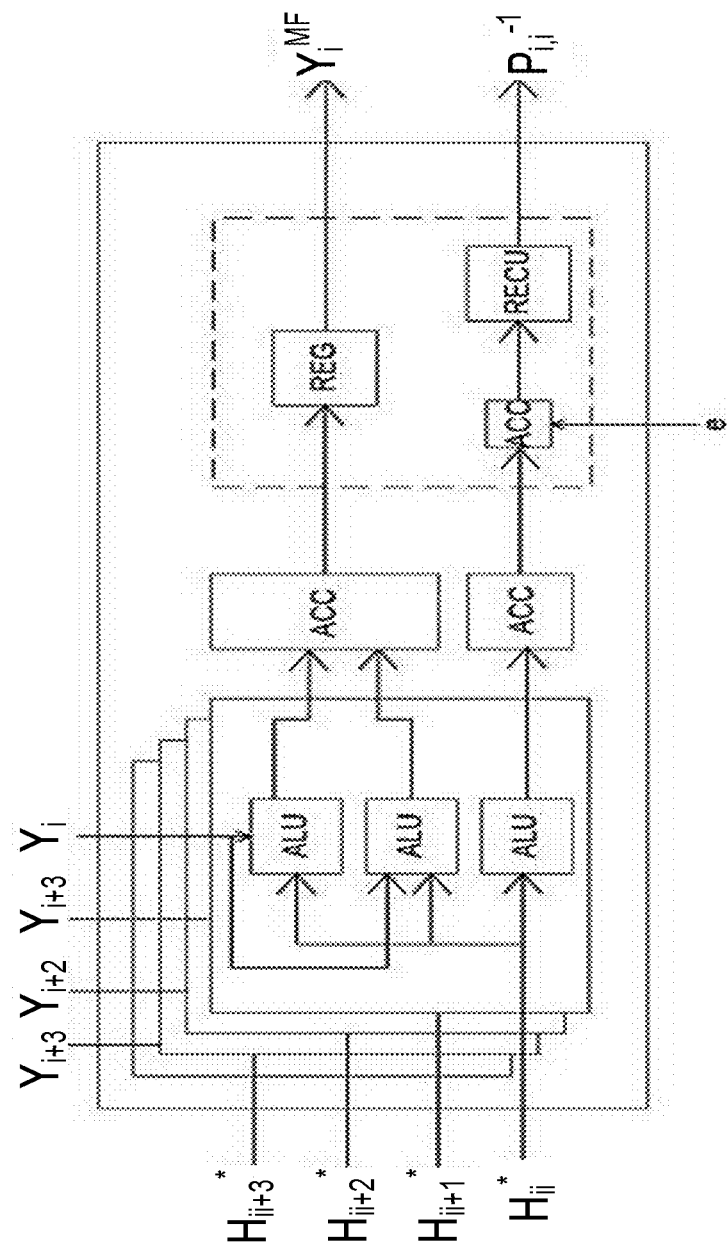
FIG. 7 is a schematic diagram of a structure of a first processing unit PE-A according to an embodiment of the present disclosure.

Specifically, FIG. 7 is schematic diagram of the PE-A. As shown in FIG. 7, the PE-A mainly includes arithmetic logic units ALUs, accumulators ACCs, a register REG and a reciprocal unit RECU. The inputs of the PE-A include a complex matrix and a complex vector, and the outputs include a complex vector and a real number array formed by a group of principal diagonal matrix elements (principal diagonal elements multiplied by a matrix and a conjugate matrix). As shown in FIG. 7, in the input direction, they are formed by 4 first arithmetic logic unit ALU arrays with the same structure, and each of the first ALU arrays includes 3 arithmetic logic units ALUs, configured to calculate the multiplication of complex numbers. Since the multiplication of matrices is relatively regular, 4 first ALU arrays with the same structure improve the number of the multiplication at a same time, and fasten the calculation speed. There are two accumulators in the middle. Following the two accumulators, there are the register, an accumulator and the reciprocal unit. The register at the right top is configured to sync output with the accumulator and the reciprocal unit, in which the reciprocal unit is formed by lookup tables.

The function of the PE-A mainly includes calculating the multiplication of the matrix and the vector and the multiplication of the matrix and the conjugate transpose matrix. The calculation steps may include: first matrix H* and vector y are input, in which 4 groups of data may be input at each clock period. The two ALUs on the top part of FIG. 7 are configured to calculate a multiplication of the respective elements in H* and y, and the result is formed as a final result $y^{MF}$ after accumulation; and the rest ALU on the bottom part is configured to calculate a multiplication of H* and the conjugate transpose of itself H, and after adding an additional parameter e after accumulation, and a final result is obtained by calculating a reciprocal value of the principal diagonal elements of the obtained matrix via the RECU.

Figure 8:
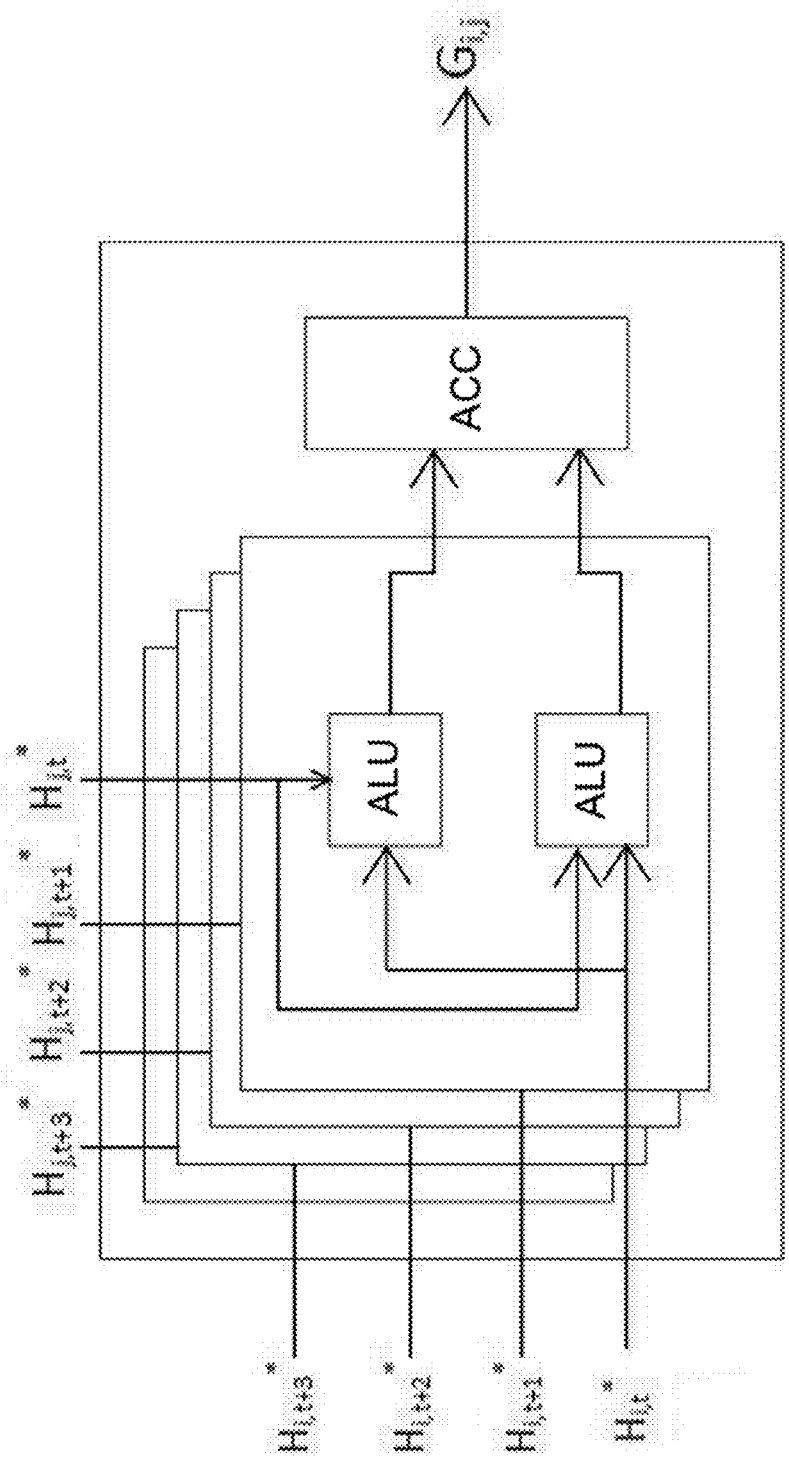
FIG. 8 is a schematic diagram of a structure of a second processing unit PE-B according to an embodiment of the present disclosure.

FIG. 8 is a schematic diagram of a structure of the PE-B. As shown in FIG. 8, the PE-B mainly includes arithmetic logic units ALUs and an accumulator ACC. The inputs of the PE-A include a complex matrix, and the outputs include a complex vector, too. There are 4 second arithmetic logic unit ALU arrays with the same structure as shown in the left part of FIG. 8, and each of the 4 second arithmetic logic unit ALU arrays has 2 ALU units configured to calculate a multiplication of complex numbers.

The function of PE-B mainly includes calculating the Gram matrix G, i.e. a multiplication of the matrix and the conjugate transpose of itself, The calculation steps may include: first columns and rows that needed to be multiplied for the matrix H are input to the 4 second ALU arrays, and 4 groups of data may be input at each clock period, after a multiplication is performed via the ALU arrays, the result is formed a final result matrix G after accumulation.

Figure 9:
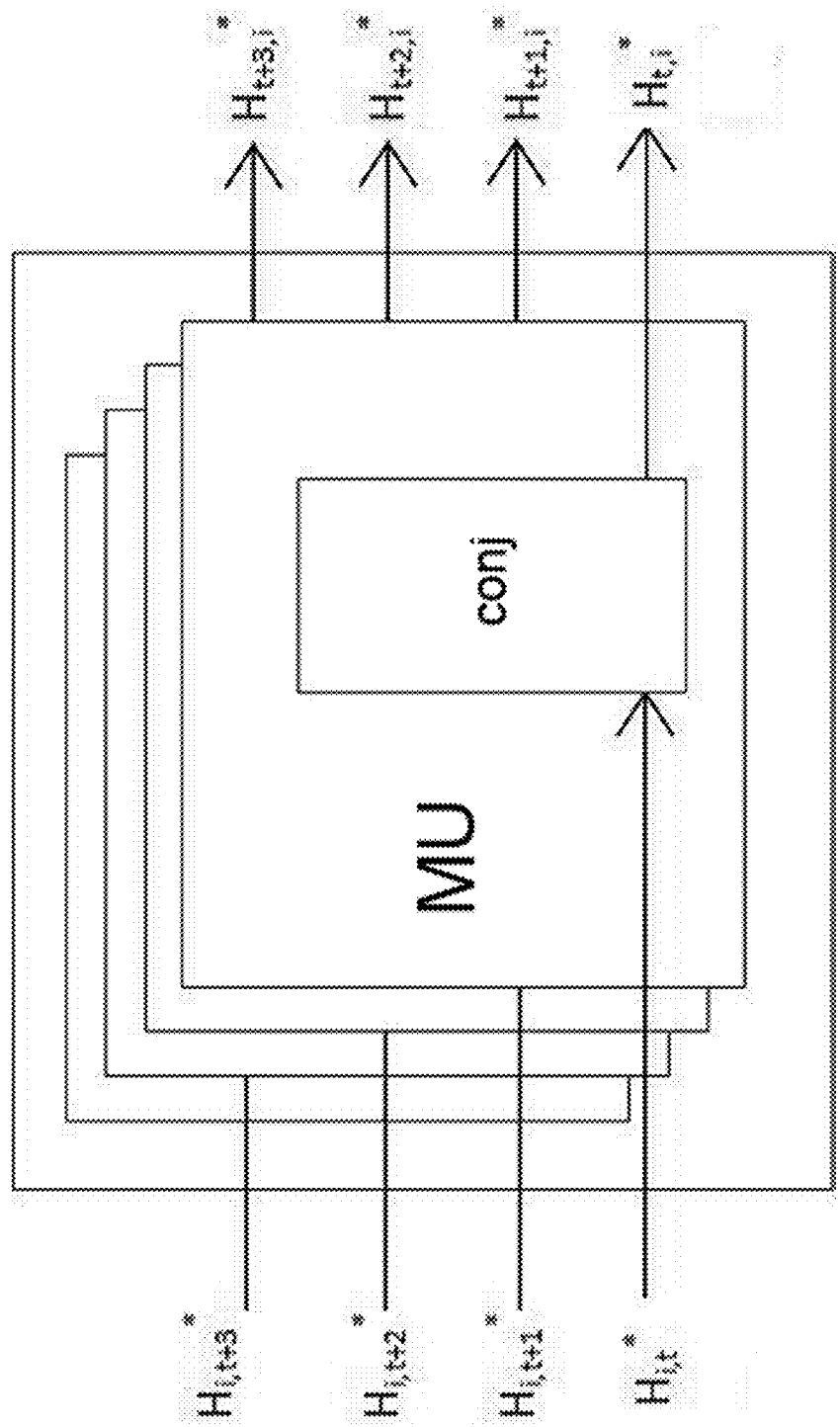
FIG. 9 is a schematic diagram of a structure of a third processing unit PE-C according to an embodiment of the present disclosure.

FIG. 9 is a schematic diagram of a structure of the PE-C. As shown in FIG. 9, the PE-C mainly includes conjugate complex module arrays. The structure of the PE-C is relatively simple, e.g. the PE-C may be formed by 4 conjugate complex module arrays, where the 4 arrays are maintained the same with the PE-A and the PE-B so as to synchronize the calculation. The function of PE-C mainly includes calculating the conjugate transpose of the matrix. The matrix H is input, in which 4 groups of complex numbers may be input at each time period, then the conjugate transpose of the matrix may be obtained via a conjugate complex module Conj, and finally the conjugate transpose matrix H* of the matrix H is obtained.

Figure 6:
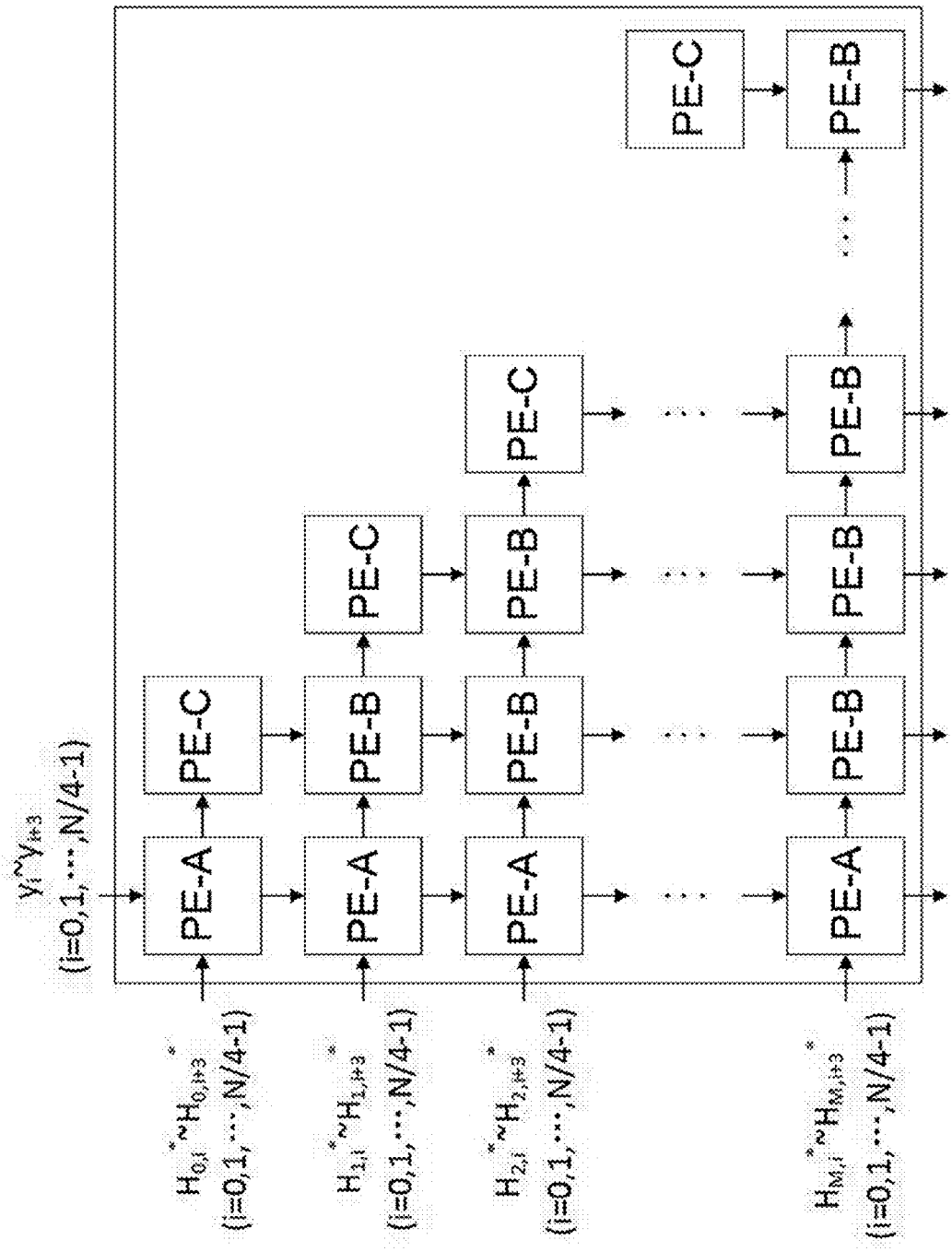
FIG. 6 is a schematic diagram of a structure of a matrix and matched filtering calculating circuit according to an embodiment of the present disclosure.

As shown in FIG. 6, the Gram matrix and matched filtering calculating circuit 10 includes a unilateral input diagonal calculated base pulse calculation array. The Gram matrix and matched filtering calculating circuit 10 complete calculations: $y^{MF}=H^H y$, $G=HH^H$, $A=HH^H+M_0 E_s^{-1} I_M$, and $P^{-1}$.

The Gram matrix and matched filtering calculating circuit 10 includes three different processing units: PE-As, PE-Bs, and PE-Cs. The PE-As are used to calculate the matched filter signal $y^{MF}$, principal diagonal elements of the Gram matrix and the respective reciprocal of the principal diagonal elements. The PE-Bs are used to calculate the non-principal diagonal matrix of the filtering matrix A. Depending on the characteristics of the Gram matrix, and the expression $A=G+N_0 E_s^{-1} I_M$, the upper triangular part of the calculation can be omitted according to principal diagonal symmetry, so as to reuse the lower triangular part. The PE-Cs are used to calculate the conjugate matrix of the matrix. Following the clock sequence, specific calculation steps are as follows.

(1) In a first clock cycle: four elements in the $1^{th}$ to $4^{th}$ columns of the first row of the matrix $H^H$ are input into the PE-A in the first row and the first column, the $1^{th}$ to $4^{th}$ elements of a vector y are input into the PE-A in the first row and the first column, and after the multiplication accumulation of the PE-A in the first row and the first column, a sum of first four parts of the first element of the $y^{MF}$ is calculated, meanwhile, a sum of first four parts of the first element of the principal diagonal of the Gram matrix is calculated.

(2) In a second clock cycle: four elements in the $5^{th}$ to $8^{th}$ columns of the first row of the matrix $H^H$ are input into the PE-A in the first row and the first column, the $5^{th}$ to $8^{th}$ elements of a vector y are input into the PE-A in the first row and the first column, and after the same calculation with the first clock cycle, a sum of second four parts of the first element of the $y^{MF}$ and a sum of second four parts of the first element of the principal diagonal of the Gram matrix are calculated; the four elements in the $1^{th}$ to $4^{th}$ columns of the first row of the matrix $H^H$ input into the PE-A in the first row and the first column in the first clock cycle are entered into the first row and the first column of the PE-C for calculating so as to obtain the respective conjugate complex; the $1^{th}$ to $4^{th}$ elements of the vector y input into the PE-A in the first row and the first column are entered down into the PE-A in the second row and the first column, after the multiplication accumulation of the PE-A in the second row and the first column, a second element of the $y^{MF}$ and a second element of the principal diagonal of the Gram matrix is calculated.

(3) In a third clock cycle: the PE-As in the first row and first column and in the second row and the first column continue the same operations, while the subscript of the column of the input data plus 4 for each period. Meanwhile, the conjugate complex output by the PE-C in the first row and the second column is entered down into the PE-B in the second row and the second column, the four elements of the $H^H$ input in PE-A in the second row and the first column (the four elements in the $5^{th}$ to $8^{th}$ columns in the first row of the matrix $H^H$) in the second clock cycle are continued to be entered into the PE-B in the second row and the second column to perform a matrix multiplication calculation, so as to obtain $G_{0,1}$, i.e. the non-principal diagonal elements, or i.e. the non-principal diagonal elements of A; meanwhile, the PE-A in the third row and the first column begins to input data, which is similar to the PE-A in the second row and the first column, which shall not be elaborated herein.

And so on, in a $k^{th}$ clock cycle, each $H^H$ is transferred from the PE-A to the PE-B, and continue moving rightward to the PE-C and then downward after calculating the conjugation; and each y element continue moving downward. At the same time in the $k^{th}$ row of $H^H$ after k−1 clock cycle delay, the data is started to be input to ensure the calculation of the input of synchronization for each unit. In a $(N/4-1)^{th}$ cycles, an input of the four elements of the $H^H$ in the PE-A in the first row and the first column is completely finished, triangular elements on the up left of the matrix G is calculated, a noise parameter $N_0E_s^{-1}$ is added and a reciprocal is output, meanwhile the first element is output after the calculation of the $y^{MF}$. Finally, a matrix P is constituted by calculating the reciprocal of all the diagonal elements of A, a matrix Q is constituted by all the non-diagonal elements, and the matrix G and the vector $y^{MF}$ are output.

Figure 10:
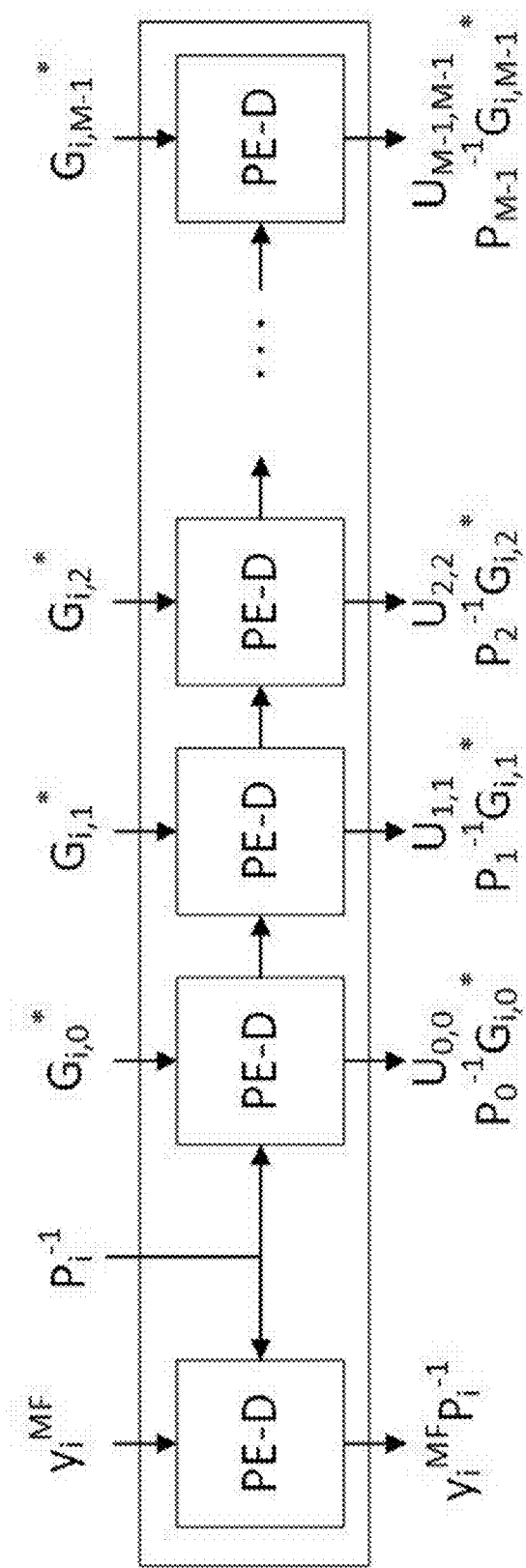
FIG. 10 is a schematic diagram of a structure of a pre-processing circuit according to an embodiment of the present disclosure.

Note that, first since the matrix P needs to use the matrix R and T in the calculations, the PE-A is placed in the leftmost to be calculated first. Next, the calculation result of the PE-A is immediately transmitted in each clock cycle to the next PE to calculate, therefore the design can achieve high data throughput for the completion of the hardware. As shown in FIG. 10, the pre-processing circuit 20 may be formed by parallelly connecting serially connected M−1 fourth processing unit PE-D with one fourth processing unit PE-D. The forth processing unit is configured to calculate $R=P^{-1}Q$, $U_{ii}=(P^{-1}G)_{ii}$ and $T=P^{-1}y^{MF}$, in which, R is the parameter matrix, P is the principal diagonal matrix, $P^{-1}$ is the reciprocal value of the principal diagonal matrix, Q is the non-principal diagonal matrix, $U_{ii}$ indicates elements of the principal diagonal in the effective channel gain matrix, G is the channel Gram matrix, H is the channel matrix, T is the parameter vector, and $y^{Mf}$ is the matched filtering signal.

For example, calculation steps may be as follows.

In step S1, the corresponding $y_i^{MF}$, $P_i^{-1}$, and the $i^{th}$ row of Q are input in the $i^{th}$ clock cycle.

In step S2, $T_i$ is calculated in the leftmost PE-D; at the right side, each element in the $i^{th}$ row of Q is multiplied by $P_1^{-1}$, and then the $i^{th}$ row of R is obtained, after M cycles the R and T are calculated. Since elements in P here are real numbers, the calculation is simple.

In step S3, when is needed to calculate, the corresponding elements of matrix G are input into the PE-D on the right side.

Since each clock cycle PE-D can be calculated from the synchronized results, such that the degree of parallelism of this structure is very high.

Figure 11:
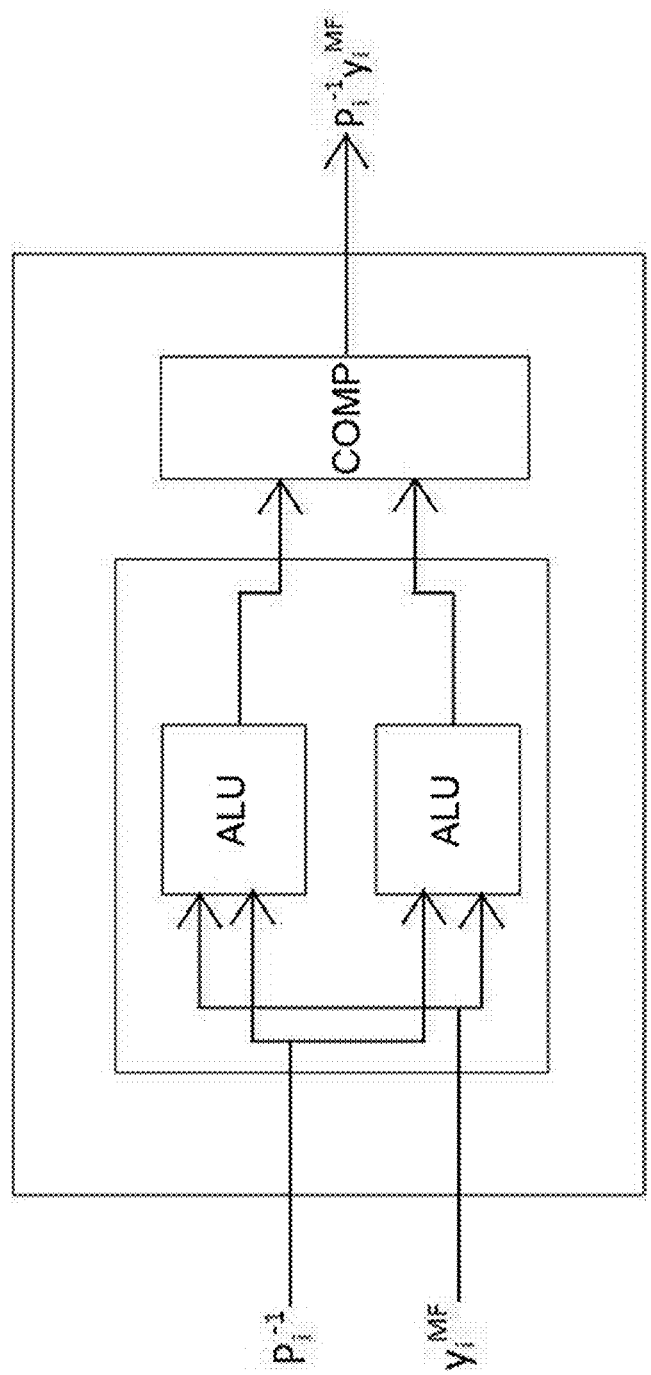
FIG. 11 is a schematic diagram of a structure of a fourth processing unit PE-D according to an embodiment of the present disclosure.

FIG. 11 is a schematic diagram of a structure of a structure of the PE-D. As shown in FIG. 11, the PE-D mainly includes: an arithmetic logic unit ALU and a real- complex conversion unit COMP. For the PE-D, one input is a real number vector $P^{-1}$, the other input can be a complex vector $y^{MF}$, and it can also be a complex matrix G, and the output is a complex matrix or a group of principal diagonal elements of the matrix. These are two ALUs which are used to calculate the complex multiplication and a real-complex converter for converting the calculated real number to a complex number to better calculate with other complex matrices. The function of the PE-D mainly includes computing the product of a vector and a vector matrix, which may be as follows: multiplying one respective element in a vector or in a matrix at each clock cycle, obtaining a real part and an imaginaries part, and then inputting the real part and the imaginaries part to the real-complex converter to obtain a final result.

The iterative circuit 30 includes: a plurality of the fifth processing units PE-Es, configured to obtain an iterative initial value according to the parameter matrix and the parameter vector, and to perform the iterative calculation according to the iterative parameter and the iterative initial value, and to obtain an iterative final value if the number of iterations reaches a preset number.

Figure 12:
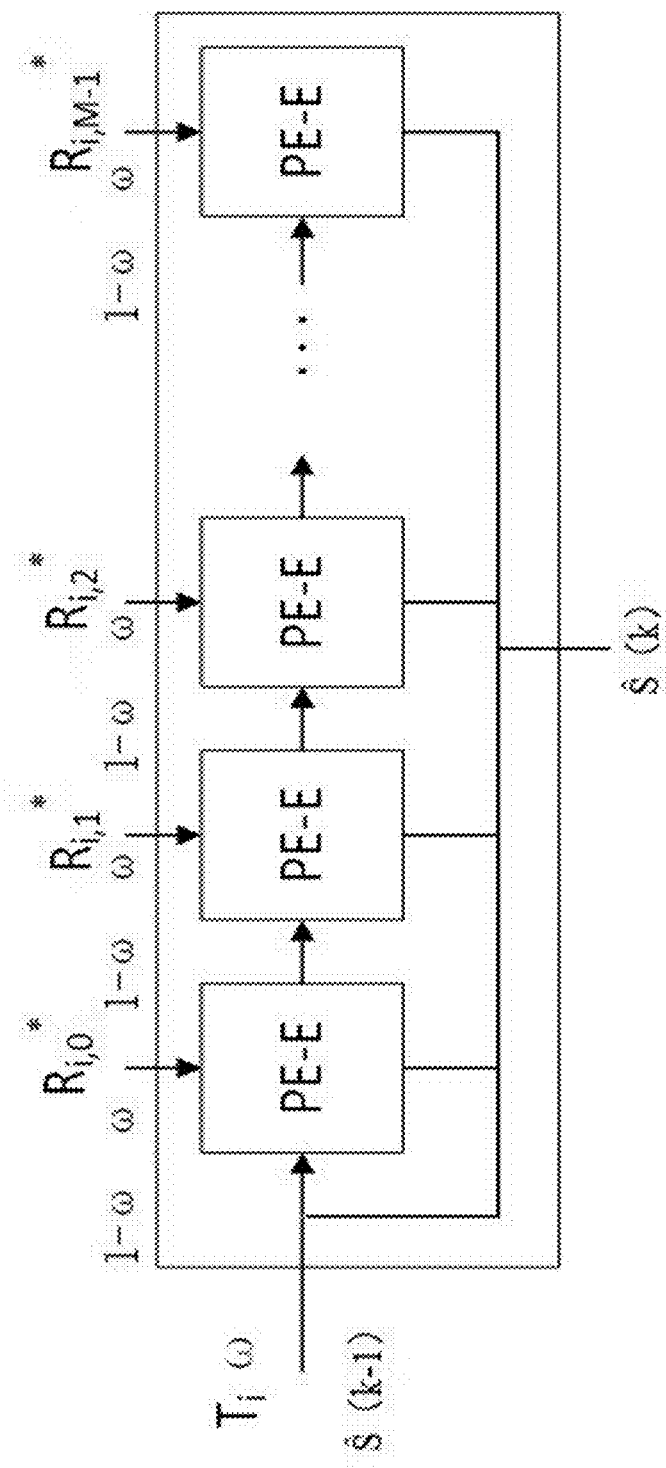
FIG. 12 is a schematic diagram of a structure of an iterative circuit according to an embodiment of the present disclosure.

As shown in FIG. 12, the iterative circuit 30 is formed by serially connecting M fifth processing units PE-Es. The iterative circuit is configured to calculate an iterative initial value $ŝ(0)$ by a formula of $ŝ(0)=(I−R)T$ and to finish the final iterative calculation by a formula of $ŝ(k)=Bŝ(k−1)+F$. The calculation of the iterative circuit 30 may be divided into two stages, the input for each stage is not all the same, and therefore a register file is embodied in the PE-Es so as to change the input. The calculation steps may be as follows.

In step S1, at the first stage, in order to calculate the initial iteration value $ŝ(0)$, at the first time cycle, element $T_i$ is input from the first PE-E on the left side, and a calculation of a multiplication after a subtraction is finished for the element $T_i$ and elements in matrix R input at the same time.

In step S2, each time cycle T subsequent, vector elements are moved rightward and the element R of the $i^{th}$ PE-E is in a delay of (i−1) input cycle, after the completion of subtraction and multiplication with the results of previously is reserved to accumulate until the calculation of $ŝ(0)$ is completed.

In step S3, entering a second stage, in the $i^{th}$ cycle, the input vector element $T_i$ is changed into the initial vector elements $ŝ(0)$, while changing the input configuration for each PE-E, each vector for the element is moved rightward, and the first iteration is calculated by $ŝ(1)=((1ω) I−ω)Rŝ(0)+ωT$.

In step S4, step S3 is repeated until $ŝ(k)$ is calculated after k iterations.

On the basis of ensuring each of the above modules to match the period of the operation, the number of processing units may be reduced accordingly, while maintaining high data throughput and reducing the chip area and power consumption, the computational parallelism may be fully used.

Figure 13:
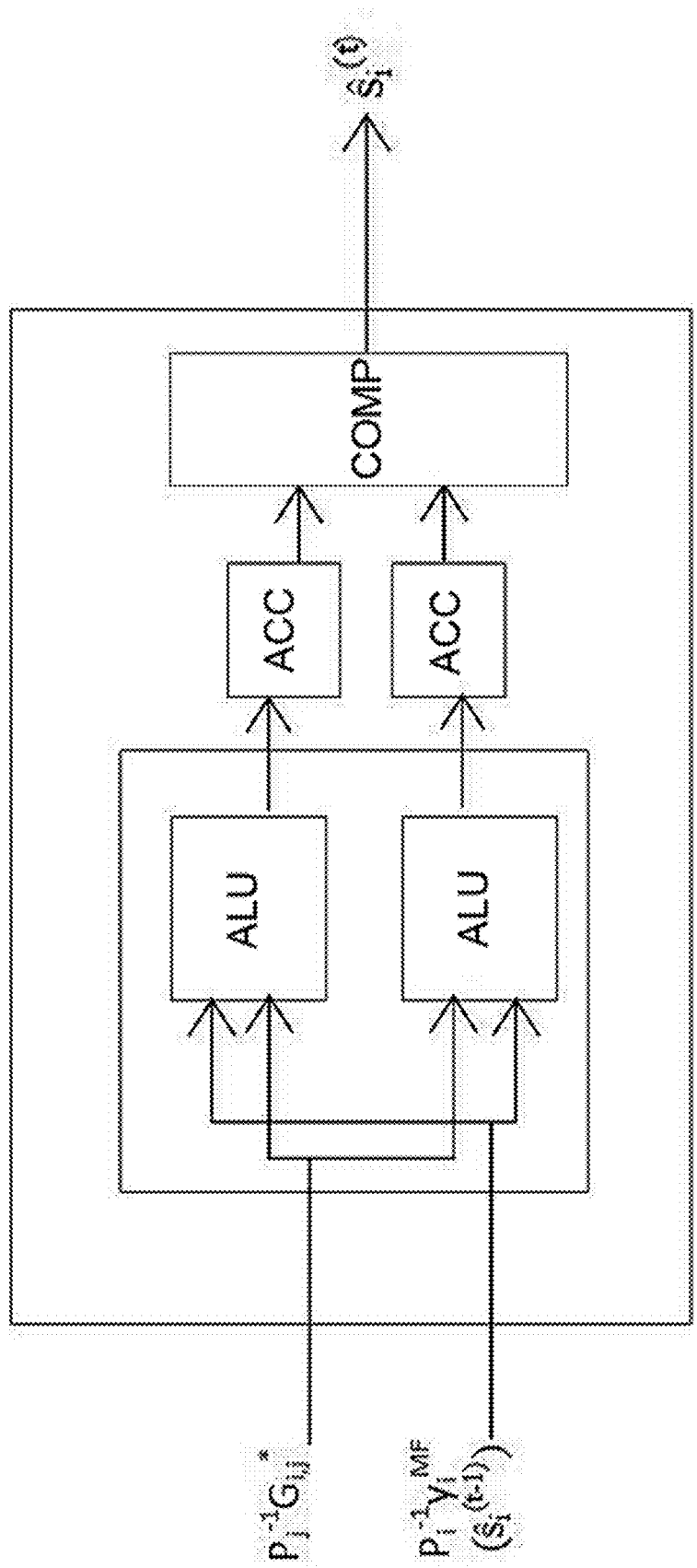
FIG. 13 is a schematic diagram of a structure of a fifth processing unit PE-E according to an embodiment of the present disclosure.

FIG. 13 is a schematic diagram of a structure of the PE-E. As shown in FIG. 13, the PE-E mainly includes: arithmetic logic units ALUs, accumulators ACCs and a real-complex conversion unit COMP. The input of the PE-E may include a matrix and also may be a vector, which shall change in the calculation of the process, which shall not be elaborated herein.

The function of the PE-E mainly includes calculating a multiplication between a vector and a vector/matrix. The calculation steps are similar to the calculation steps of the PE-D, and only two accumulators are added between the ALU unit and the COMP unit.

Further, the maximum log likelihood rate calculating circuit 40 is configured to obtain the maximum log likelihood rate by detecting a result vector and an effective channel gain. The maximum log likelihood rate calculating circuit 40 includes: a plurality of the sixth processing units the PE-Fs, configured to calculate a computation signal according to the linear functions, and to obtain a. maximum log likelihood rate according to the computation signal and the signal to interference plus noise ratio SINR.

Figure 14:
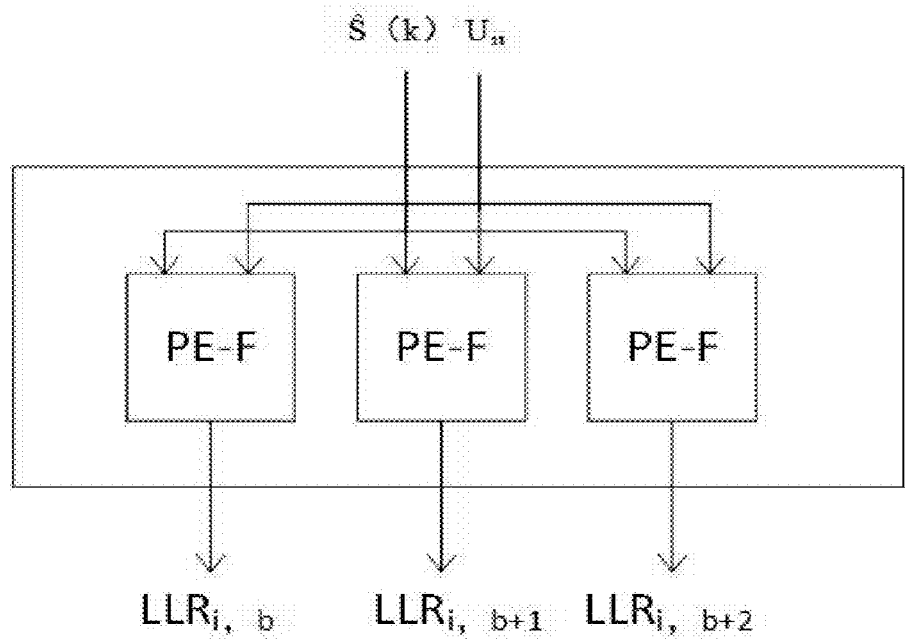
FIG. 14 is a schematic diagram of a structure of a maximum log likelihood rate calculating circuit according to an embodiment of the present disclosure.

As shown in FIG. 14, the maximum log likelihood rate calculating circuit 40 may be constituted by three PE-Fs. After a signal transmitted from the user device is detected by the base station, since the signal conducted snapping, e.g. Gray code mapping, on the user device, and therefore also a decoding step is required, and this operation is determined by the maximum log likelihood rate calculating circuit 40, which can be calculated as follows.

In step S1, a linear equation $$\varphi_b(\hat{s}_i) = \min_{s \in S_b^0} \left| \frac{\hat{s}_i}{U_{ii}} - s \right|^2 - \min_{s \in S_b^1} \left| \frac{\hat{s}_i}{U_{ii}} - s \right|^2$$

is calculated. For each PE-F. the inputs are $\hat{s}_i$ and $U_{ii}$, and a lookup table is used to calculate a reciprocal, and a subtraction, multiplication and division are performed. Step S1 is performed in a corresponding LUT and ALU in the PE-F.

In step S2, the maximum log likelihood rate $L_{i,b}$ is obtained by multiplying the computation signal with the SINR.

It should be noted that the $\phi_b(\hat{s})$ calculated in each step may be stored in a lookup table, and meanwhile the $U_{ii}$ also comes from the pre-processing step.

Figure 15:
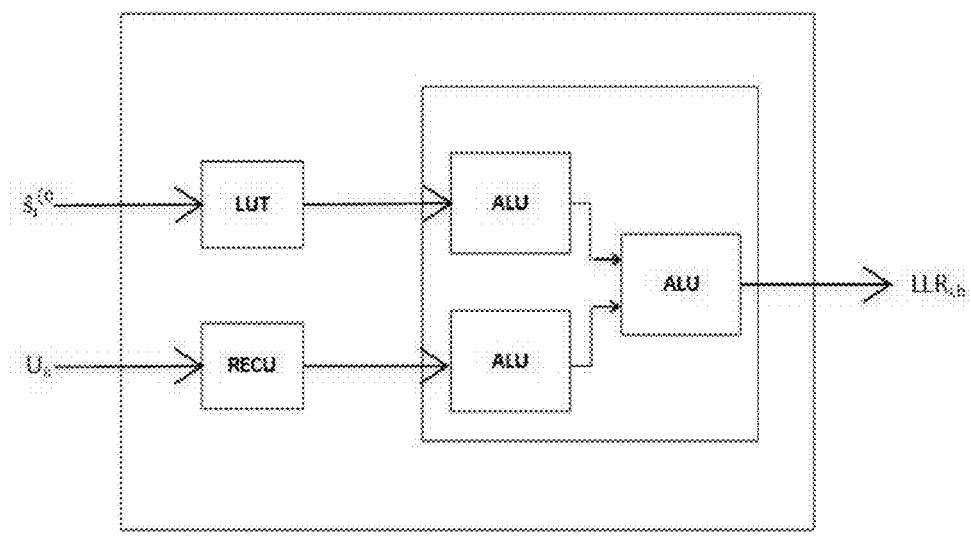
FIG. 15 is a schematic diagram of a structure of a sixth processing unit PE-F according to an embodiment of the present disclosure.

FIG. 15 is a schematic diagram of the structure of the PE-F. As shown in FIG. 15, the PE-F mainly includes: arithmetic logic units ALUs, a lookup table LUT and a reciprocal unit RECU. The inputs of the PE-F are two groups of complex vectors or matrices, and the output is a group of complex arrays. The structure is shown in the left side of the composition of the lookup table and the reciprocal units, and the left side is constituted by two parallel ALU units and an ALU in series. The function of the PE-F mainly is configured to calculate the final maximum log likelihood rate.

Connecting the above four circuits according to the input and the output, a final circuit may be obtained, and the overall structure diagram are shown in FIG. 4, and finally an Extrapolated Parallelizable Iteration (EXPI) algorithm for the signal detecting and decoding of the uplink is realized in a large scale multi-input multi-output wireless communication system. The design for each module of the circuit is based on a. pipeline structure, and the data parallel computing is used completely so as to achieve a high-speed low-power detection decoding.

In the calculation process, through a new idea that directly solving equations other than seeking the inverse of the coefficient matrix multiplication at first, the hardware efficiency is improved, the computational parallelism is also increased by dividing steps.

In addition, since the detection and decoding will finally be implemented on an integrated circuit chip, such as FPGA, ASIC, DSP, etc., the computational algorithm is a measure of the merits of important indicators. Since either the minimum mean square error (MMSE) algorithm or the Extrapolated Parallelizable Iteration algorithm needs to calculate the Gram matrix and the matched filtering $y^{MF}$, and therefore the amount of the calculation here includes only steps after this step. Here is the amount calculated using the number of real number multiplication algorithm to measure, due to a hardware multiplier circuit overhead is relatively expensive, which shall be more objective.

According to the signal detection device disclosed in the embodiments of the present disclosure, first the matched filtering signal of the encoded signal is obtained; the filter matrix used in the process of obtaining the matched filtered signal is determined; the filter matrix is decomposed, so as to obtain the principal diagonal matrix and the non-principal diagonal matrix; the parameter matrix and the parameter vector for the iterative calculation are obtained according to the principal diagonal matrix, the non-principal diagonal matrix, and the matched filtering signal; the iterative parameter and the iterative initial value are obtained according to the parameter matrix and the parameter vector; and the iterative calculation is performed according to the iterative parameter and the iterative initial value; and the iterative final value is used to obtain the input of the decoder, so as to realize the signal detecting. The signal detection method disclosed in the present disclosure may reduce the computational complexity and bit error rate, improve data throughput, and more advantageous for use in the large-scale multi-input multi-output system.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A signal detecting method, applied to a base station which is configured to receive an encoded signal, and comprising:
    obtaining, with one or more processors, a matched filtering signal, a channel Gram matrix and a filtering matrix, wherein the matched filtering signal is obtained by performing antenna matched filtering on the encoded signal;
    determining, with the one or more processors, a filtering matrix used when obtaining the matched filtering signal according to a channel matrix, a noise power spectrum density, an average power for each transmission signal, a unit matrix and the number of antennas in the antenna array of the base station;
    decomposing, with the one or more processors, the filtering matrix to obtain a principal diagonal matrix and a non-principal diagonal matrix;
    obtaining, with the one or more processors, a parameter matrix and a parameter vector for an iterative calculation according to the principal diagonal matrix, the non-principal diagonal matrix, and the matched filtering signal;
    obtaining, with the one or more processors, an iterative parameter and an iterative initial value according to the parameter matrix and the parameter vector; and
    performing, with the one or more processors, the iterative calculation according to the iterative parameter and the iterative initial value;
    if the number of iterations reaches a preset number, obtaining an iterative final value with the one or more processors, and obtaining with the one or more processors an input of a decoder according to the iterative final value, so as to decode the encoded signal and to realize a signal detecting.

2. The signal detecting method according to claim 1, wherein, obtaining a matched filtering signal comprises:
    obtaining the matched filtering signal by a formula of $$y^{MF}=H^H y,$$

where, y is the encoded signal which is a signal via a channel received by an antenna array of the base station, $y^{MF}$ is the matched filtering signal, H is a channel matrix, and $H^H$ is a conjugate transpose matrix of the channel matrix H.

3. The signal detecting method according to claim 1, wherein the filtering matrix is obtained by a formula of $$A=H^H H+N_0 E_s^{-1} I_M,$$

where, A is the filtering matrix, H is the channel matrix, $H^H$ is a conjugate transpose matrix of the channel matrix H, $N_0$ is the noise power spectrum density, $E_s$ is the average power for each transmission signal, $E_s^{-1}$ is a reciprocal value of the average power for each transmission signal, $I_M$ is the unit matrix, and M is the number of antennas in the antenna array of the base station.

4. The signal detecting method according to claim 1, wherein, obtaining a parameter matrix and a parameter vector for an iterative calculation according to the principal diagonal matrix, the non-principal diagonal matrix, and the matched filtering signal comprises:
    obtaining the parameter matrix according to the principal diagonal matrix and the non-principal diagonal matrix by a formula of $$R=P^{-1}Q,$$

where, R is the parameter matrix, P is the principal diagonal matrix, $P^{-1}$ is an inverse matrix of the principal diagonal matrix, and Q is the non-principal diagonal matrix;

obtaining the parameter vector according to the principal diagonal matrix and the matched filtering signal by a formula of $$T=P^{-1}y^{MF},$$

where, T is the parameter vector, and $y^{MF}$ is the matched filtering signal.

5. The signal detecting method according to claim 1, wherein, the iterative parameter comprises an iterative coefficient matrix and an iterative constant matrix;

and obtaining an iterative parameter and an iterative initial value according to the parameter matrix and the parameter vector, comprises:

obtaining the iterative coefficient matrix according to a time relaxation parameter and the parameter matrix by a formula of $$B=(1-\omega)I-\omega R,$$

where, B is the iterative coefficient matrix, ω is the time relaxation parameter, and I is a unit matrix, R is the parameter matrix;

obtaining the iterative constant matrix according to the time relaxation parameter and the parameter vector by a formula of $$F=\omega T,$$

where, F is the iterative constant matrix, T is the parameter vector; and obtaining the iterative initial value according to the parameter matrix and the parameter vector by a formula of $$\hat{s}(0)=(I-R)T,$$

where, ŝ(0) is the iterative initial value.

6. The signal detecting method according to claim 5, wherein, performing the iterative calculation according to the iterative parameter and the iterative initial value, comprises:

performing the iterative calculation by a formula of $$\hat{s}(k)=B\hat{s}(k-1)+F,$$

where, k is the number of iterations, and k is a positive integer equal to or greater than 1.

7. The signal detecting method according to claim 1, wherein, wherein obtaining an input of a decoder according to the iterative final value comprises:

obtaining a computation signal according to the iterative final value and principal diagonal elements of an effective channel gain matrix by a formula of $$\varphi_b(\hat{s}_i) = \min_{s \in S_b^0} \left| \frac{\hat{s}_i}{U_{ii}} - s \right|^2 - \min_{s \in S_b^1} \left| \frac{\hat{s}_i}{U_{ii}} - s \right|^2,$$

where, $\hat{S}_i$ is the $i^{th}$ iterative final value, b is a bit index of a log likelihood rate of the $i^{th}$ user, $U_{ii}$ is the $i^{th}$ principal diagonal element of the effective channel gain matrix, $\phi_b(\hat{S}_i)$ is a computation signal corresponding to the $i^{th}$ iterative final value, min is a minimum operator, s is a transmission signal, and $S_b^0$ and $S_b^1$ denotes sets of modulation constellation symbols, in which the $i^{th}$ bit is 0 and 1, respectively;

calculating a signal to interference plus noise ratio SINR according to principal diagonal elements of the effective channel gain matrix and an average power for each transmission signal by a formula of $$\rho_i^2 = \frac{U_{ii}}{E_s(1-U_{ii})},$$

where, $\rho_i^2$ is the SINR, and $E_s$ is the average power for each transmission signal; and obtaining a maximum log likelihood rate by multiplying the computation signal with the SINR by a formula of $$L_{i,b}=\rho_i^2\phi_b(\hat{s}_i),$$

where $L_{i,b}$ is the maximum log likelihood rate, and the maximum log likelihood rate is regarded as the input of the decoder.

8. The signal detecting method according to claim 7, wherein the principal diagonal elements of the effective channel gain matrix are obtained according to the principal diagonal matrix and a channel Gram matrix by a formula of $$U_{ii}=(P^{-1}G)_{ii},$$

where, $U_{ii}$ indicates $i^{th}$ principal diagonal element of the effective channel gain matrix; wherein the channel Gram matrix is obtained according to the channel matrix by a formula of $$G=HH^H,$$

where, G is the channel Gram matrix, H is a channel matrix, and $H^H$ is a conjugate transpose matrix of the channel matrix H.

9. A signal detecting device, applied to a base station which is configured to receive an encoded signal, comprising:

a matrix and matched filtering calculating circuit, configured to calculate a matched filtering signal, a channel Gram matrix and a filtering matrix, wherein the matched filtering signal is obtained by performing antenna matched filtering on the encoded signal, and the filtering matrix used when the matched filtering signal is obtained is determined according to a channel matrix, a noise power spectrum density, an average power for each transmission signal, a unit matrix and the number of antennas in the antenna array of the base station;

a pre-processing circuit, configured to calculate a parameter matrix and a parameter vector for an iterative calculation and principal diagonal elements of an effective channel gain matrix according to the filtering matrix, the matched filtering signal and the channel Gram matrix;

an iterative circuit, configured to obtain an iterative parameter and an iterative initial value according to the parameter matrix and the parameter vector, and to perform the iterative calculation according to the iterative parameter and the iterative initial value, and to obtain an iterative final value if the number of iterations reaches a preset number; and a maximum log likelihood rate calculating circuit, configured to obtain a maximum log likelihood rate according to the iterative final value and the principal diagonal elements of the effective channel gain matrix, and to input the maximum log likelihood rate to a decoder so as to decode the encoded signal and to realize a signal detecting.

10. The signal detecting device according to claim 9, wherein, the matrix and matched filtering calculating circuit, the pre-processing circuit, the iterative circuit, and the maximum log likelihood rate calculating circuit respectively comprises at least one of a first processing unit, a second processing unit, a third processing unit, a fourth processing unit, a fifth processing unit and a sixth processing unit.

11. The signal detecting device according to claim 10, wherein, the first processing unit comprises: 4 first arithmetic logic unit arrays with the same structure, in which each of the first arithmetic logic unit arrays comprises:
3 arithmetic logic units, 2 accumulators, 1 register and 1 reciprocal unit, wherein,
an output end of a first arithmetic logic unit and an output end of a second arithmetic logic unit are connected to an input end of a first accumulator, an output end of the first accumulator is connected to the register; an output end of a third arithmetic logic unit is connected to an input end of a second accumulator, and an output end of the second accumulator is connected to the reciprocal unit.

12. The signal detecting device according to claim 10, wherein, the second processing unit comprises: 4 second arithmetic logic unit arrays with the same structure, in which each of the second arithmetic logic unit arrays comprises:
2 arithmetic logic units and 1 accumulator, wherein,
an output end of a fourth arithmetic logic unit and an output end of a fifth arithmetic logic unit are connected to an input end of the accumulator.

13. The signal detecting device according to claim 10, wherein, the third processing unit comprises: 4 conjugate complex module arrays with the same structure.

14. The signal detecting device according to claim 10, wherein, the fourth processing unit comprises: 2 arithmetic logic units and a real-plural converting unit, wherein,
an output end of a sixth arithmetic logic unit and an output end of a seventh arithmetic logic unit are respectively connected to an input end of the real-plural converting unit.

15. The signal detecting device according to claim 10, wherein, the fifth processing unit comprises: 2 arithmetic logic units, 2 accumulators and 1 real-plural converting unit, wherein
the arithmetic logic units and the accumulators are in a one-to-one connection, an output end of a third accumulator and an output end of a fourth accumulator are connected to an input end of the real-plural converting unit.

16. The signal detecting device according to claim 10, wherein, the sixth processing unit comprises: 3 arithmetic logic units, a lookup table and a reciprocal unit,
an output end of the lookup table is connected to an input end of an eighth arithmetic logic unit, an output end of the reciprocal unit is connected to an input end of an ninth arithmetic logic unit, and an output end of the eighth arithmetic logic unit and an output end of the ninth arithmetic logic unit are connected to an input end of a tenth arithmetic logic unit.

17. The signal detecting device according to claim 10, wherein, the matrix and matched filtering calculating circuit comprises a unilateral input diagonal base pulse calculation array which includes a plurality of the first processing units, a plurality of the second processing units, and a plurality of the third processing units, in which, inputs end of the unilateral input diagonal base pulse calculation array comprise the plurality of the first processing units, a diagonal base pulse on the unilateral input diagonal base pulse calculation array comprises the plurality of the third processing units, and the rest are the second processing units, wherein,
the first processing units are configured to calculate the matched filtering signal by a formula of $y^{MF}=H^H y$,
principal diagonal elements of the channel Gram matrix and a reciprocal value of the channel Gram matrix, where $y^{MF}$ indicates the matched filtering signal, H indicates the channel matrix, $H^H$ indicates a conjugate transpose matrix of the channel matrix, and y indicates the encoded signal which is a signal via a channel received by an antenna array of the base station;
the second processing units are configured to calculate the non-principal diagonal matrix of the filtering matrix, wherein the filtering matrix is obtained by a formula of $$A=H^H H+N_0 E_s^{-1} I_M,$$

where, A is the filtering matrix, $N_0$ is the noise power spectral density, $E_s$ is the average power for each transmission signal, $E_s^{-1}$ is the reciprocal value of the average power for each transmission signal, $I_M$ is a unit matrix, and M is the number of antennas in the antenna array of the base station; and
the third processing units are configured to calculate a conjugate complex matrix of a complex matrix.

18. The signal detecting device according to claim 11, wherein, the pre-processing circuit is formed by parallelly connecting serially connected M−1 fourth processing units with one fourth processing unit, M denotes the size of the effective channel gain matrix, the fourth processing units are configured to calculate $R=P^{-1}Q, U_{ii}=(P^{-1}G)_{ii}$ and $T=P^{-1}y^{MF}$, where, R is the parameter matrix, P is the principal diagonal matrix, $P^{-1}$ is an inverse matrix of the principal diagonal matrix, Q is the non-principal diagonal matrix, $U_{ii}$ indicates the $i^{th}$ principal diagonal elements of the effective channel gain matrix, G is the channel Gram matrix, H is the channel matrix, T is the parameter vector, and $y^{MF}$ is the matched filtering signal.

19. The signal detecting device according to claim 11, wherein, the iterative circuit is formed by serially connecting M fifth processing units, and the fifth processing units are configured to calculate an iterative initial value by a formula of $\hat{s}(0)=(I-R)T$ and to finish the final iterative calculation by a formula of $\hat{s}(k)=B\hat{s}(k-1)+F$, where, $\hat{s}(0)$ is the iterative initial value, I is a unit matrix, R is the parameter matrix, T is the parameter vector, B is an iterative coefficient matrix, F is an iterative constant matrix, k is the number of iterations, and k is a positive integer equal to or greater than 1.

20. The signal detecting device according to claim 11, wherein, the maximum log likelihood rate calculating circuit is formed by 3 sixth processing units, and the sixth processing units are configured to calculate a computation signal according to the iterative final value and principal diagonal elements of an effective channel gain matrix by a formula of $$\varphi_b(\hat{s}_i) = \min_{s \in S_b^0} \left| \frac{\hat{s}_i}{U_{ii}} - s \right|^2 - \min_{s \in S_b^1} \left| \frac{\hat{s}_i}{U_{ii}} - s \right|^2,$$

where, $\hat{S}_i$ is the $i^{th}$ iterative final value, b is a bit index of a log likelihood rate of the $i^{th}$ user, $U_{ii}$ is the $i^{th}$ principal diagonal element of the effective channel gain matrix, $\phi_b(\hat{S}_i)$ is a computation signal corresponding to the $i^{th}$ iterative final value, min is a minimum operator, s is a transmission signal, and $S_b^0$ and $S_b^1$ denotes sets of modulation constellation symbols, in which the $i^{th}$ bit is 0 and 1, respectively; and to calculate a signal to interference plus noise ratio SINR according to principal diagonal elements of the effective channel gain matrix and an average power for each transmission signal by a formula of $$\rho_i^2 = \frac{U_{ii}}{E_s(1-U_{ii})},$$

where, $\rho_i^2$ is the SINR, and $E_s$ is the average power for each transmission signal, and to obtain a maximum log likelihood rate by multiplying the computation signal with the SINR by a formula of $$L_{i,b} = \rho_i^2 \phi_b(\hat{S}_i),$$

where $L_{i,b}$ is the maximum log likelihood rate, and the maximum log likelihood rate is regarded as the input of the decoder.

* * * * *